(12) United States Patent
Nielsen et al.

(10) Patent No.: US 10,124,822 B2
(45) Date of Patent: Nov. 13, 2018

(54) CONFIGURABLE TRAILER DOLLY

(71) Applicant: Shanghai Cartec Industrial and Trading Co., Ltd., Shanghai (CN)

(72) Inventors: Scott Nielsen, Prior Lake, MN (US); Yonghua Xie, Shanghai (CN)

(73) Assignee: Shanghai Cartec Industrial and Trading Co., Ltd., Shanghai (CN)

( * ) Notice: Subject to any disclaimer, the term of this patent is extended or adjusted under 35 U.S.C. 154(b) by 0 days.

(21) Appl. No.: 15/464,075

(22) Filed: Mar. 20, 2017

(65) Prior Publication Data

US 2017/0267299 A1    Sep. 21, 2017

Related U.S. Application Data

(60) Provisional application No. 62/311,015, filed on Mar. 21, 2016.

(51) Int. Cl.
| | |
|---|---|
| *B62B 5/06* | (2006.01) |
| *B62B 1/12* | (2006.01) |
| *B60D 1/06* | (2006.01) |
| *B60D 1/155* | (2006.01) |
| *B60D 1/66* | (2006.01) |
| *B60S 13/00* | (2006.01) |

(52) U.S. Cl.
CPC .............. *B62B 5/067* (2013.01); *B60D 1/065* (2013.01); *B60D 1/155* (2013.01); *B60D 1/665* (2013.01); *B60S 13/00* (2013.01); *B62B 1/12* (2013.01); *B62B 2206/006* (2013.01)

(58) Field of Classification Search
CPC ........................................................ B60D 1/665
See application file for complete search history.

(56) References Cited

U.S. PATENT DOCUMENTS

| | | | | | |
|---|---|---|---|---|---|
| 2,844,389 | A | * | 7/1958 | Burnett | ................. B60P 3/1083 280/414.1 |
| 3,189,365 | A | * | 6/1965 | Blacher | .................... B60D 1/66 280/414.1 |
| 3,622,181 | A | * | 11/1971 | Smith | ................... B60P 3/1083 280/414.1 |
| 5,071,151 | A | * | 12/1991 | Irwin | ........................ B62B 1/18 180/904 |
| D365,315 | S | * | 12/1995 | Parker, Jr. | ..................... D12/162 |
| 7,296,816 | B2 | * | 11/2007 | Wilnau | ..................... B60R 9/08 280/414.2 |

(Continued)

*Primary Examiner* — Kevin Hurley
(74) *Attorney, Agent, or Firm* — Schwegman Lundberg & Woessner, P.C.

(57) ABSTRACT

A trailer dolly can include various features to be adjustable between a manual configuration and a vehicular towing configuration. In the manual configuration, a user can manually maneuver the trailer dolly to position the trailer, such as by using one or more retractable handles. Where the user desires to maneuver the trailer with a vehicle, the trailer dolly can be adjusted to the vehicle towing configuration. In an example, the trailer dolly can be coupled to the vehicle with a second hitch attached to the trailer dolly, the second hitch located distally along the tow bar with respect to the trailer hitch supporting the trailer load. Accordingly, the trailer dolly can be used for both manual and vehicular applications and the user can transition between the manual and vehicular configurations while the trailer is hitched to the trailer dolly.

19 Claims, 3 Drawing Sheets

(56) References Cited

U.S. PATENT DOCUMENTS 7,845,670 B2 * 12/2010 Oberg ..................... B60D 1/66
  280/47.24
8,282,118 B1 * 10/2012 De La Fuente, Sr. ........... B60D 1/07
  280/476.1

* cited by examiner

US 10,124,822 B2

CONFIGURABLE TRAILER DOLLY

CLAIM OF PRIORITY

This patent application claims the benefit of priority of U.S. Provisional Patent Application Ser. No. 62/311,015, entitled "RECONFIGURABLE TRAILER DOLLY," filed on Mar. 21, 2016, which is hereby incorporated by reference herein in its entirety.

TECHNICAL FIELD

This document pertains generally, but not by way of limitation, to a trailer dolly to facilitate towing and movement of a wheeled trailer.

BACKGROUND

Trailer dollies, such as manually-operable (human-operable) trailer dollies are generally used to maneuver and relocate wheeled trailer loads, such as storage trailers or trailers for towing boats or recreational vehicles. A trailer dolly or trailer "hand truck" can be used to relocate the trailer load a short distance, such as where positioning the trailer load with a vehicle may be difficult. For example, in tight spaces there may be a lack of clearance to hitch the trailer load to a vehicle or maneuver the trailer load into the desired location using a vehicle. The trailer dolly can be used for repositioning a trailer load manually without the vehicle.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
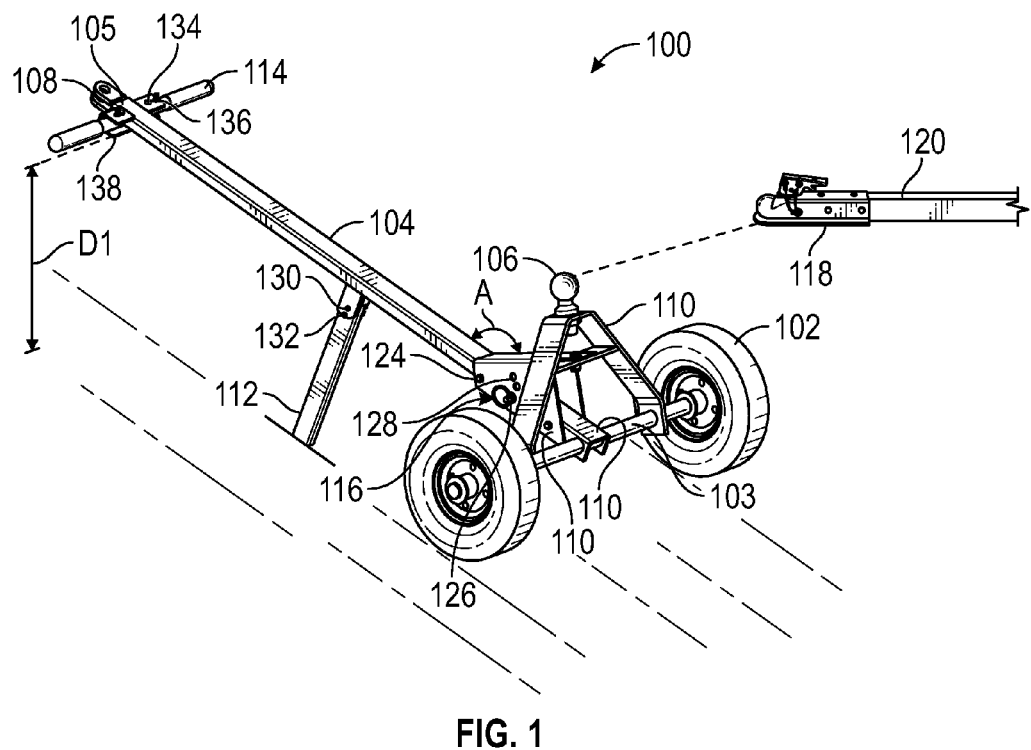
FIG. 1 illustrates an example of a configurable dolly in a manual configuration, according to an embodiment.

The present application relates to devices and techniques for a trailer dolly, such as a multi-configuration trailer dolly having a manual configuration and a vehicle towing configuration. The following detailed description and examples are illustrative of the subject matter disclosed herein; however, the subject matter disclosed is not limited to the following description and examples provided. Portions and features of some embodiments may be included in, or substituted for, those of other embodiments. Embodiments set forth in the claims encompass all available equivalents of those claims.

The present inventors have recognized, among other things, that maneuvering a trailer manually and coupling the trailer to a vehicle for additional maneuvering generally requires use of two entirely separate dolly configurations or devices. For example, a dolly used for vehicular attachment (such as coupleable to an All-Terrain Vehicle (ATV), truck, or tractor) generally has an entirely different configuration as compared to a hand-operated dolly.

The present subject matter can provide a solution to this problem, such as by providing a configurable dolly. For example, adjustably mounting a tow bar to a frame of a configurable dolly can allow use of different towing configurations for hand towing versus vehicular towing. The configurable dolly can include various features to be adjustable between a manual tow configuration and a vehicular tow configuration. In the manual configuration, a user can manually maneuver the configurable dolly to position the trailer, such as by using one or more stow-able or retractable handles or other user interface (e.g., strap).

In an example, the configurable dolly can include a frame, a tow bar, at least one wheel or other type of ground traversing member (e.g., a skid), and at least one handle or other type of user interface (e.g., strap). For instance, two or more wheels can be coupled to an axle and the axle can be coupled to the frame. A first hitch (e.g., trailer hitch) can be attached to the configurable dolly for coupling the configurable dolly to a trailer. For example, the first hitch can be coupled to the frame at a location near the wheel so the weight of the trailer to be towed (e.g., a tongue weight) is supported generally by the at least one wheel. Accordingly, a user can maneuver the trailer with the tow bar (via the handle) and correspondingly move the configurable dolly (e.g., by rolling the wheels) along a ground surface, such as a boat ramp, parking lot, or warehouse.

Where the user desires to maneuver the trailer with a vehicle, the configurable dolly can be adjusted to the vehicle configuration. In an example, the configurable dolly can be coupled to the vehicle with a second hitch (e.g., a clevis hitch) attached to the configurable dolly, the second hitch can be located distally along the tow bar with respect to the first hitch supporting the trailer load. Accordingly, the configurable dolly can be used for both manual and vehicular applications and the user can transition between the manual and vehicular configurations while the trailer is hitched to the configurable dolly.

FIG. 1 depicts a perspective view of an example of a configurable dolly 100 in a manual configuration. As previously described, the configurable dolly 100 can include two or more wheels 102, a tow bar 104, a first hitch 106 (e.g., trailer hitch), and a second hitch 108 (e.g., tow hitch). The at least one wheel 102 can be rotatably coupled to an axle, such as axle 103, and the axle 103 can be coupled to a frame 110. The first hitch 106 can be attached to the frame 110 and used to couple the configurable dolly 100 to a trailer receiver 118. The tow bar 104 can be adjustably coupled to the frame 110 using, at least in part, a locking mechanism 116. For instance, the tow bar 104 can be movably coupled to the frame 110, such as rotatably coupled to the frame 110. The locking mechanism 116 can secure the tow bar 104 in at least two configurations, including a manual configuration (as shown, for example, in FIG. 1) and a vehicle towing configuration (as shown, for example, in FIG. 2). In the manual configuration, the tow bar 104 can be disposed at a first angle A relative to the fame 110. The configurable dolly 100 can include one or more handles (such as a handle 114) coupled to the tow bar 104, such as near an end 105 of the tow bar 104. The handle 114 can be used to maneuver a trailer, such as trailer 120, with the configurable dolly 100 by hand. In the vehicle towing configuration, the tow bar 104 can be disposed at a different second angle B relative to the frame 110 to position the second hitch 108 for mating with a vehicle (e.g., a tow vehicle). Accordingly, the second hitch 108 can be mated with a receiver of the vehicle for towing the trailer using the configurable dolly 100.

The frame 110 can include one or more beams, tubes, or structures, such as a truss geometry shown in the example of FIG. 1. The frame 110 can be constructed of one or more materials including, but not limited to, steel, aluminum, polymer, composite, or the like. In an example, the frame 110 can be configured to position the first hitch 106 at a position above the ground that is compatible with a trailer receiver 118 of the trailer 120, for instance, aligned with a tongue height of the trailer 120. In some examples, the first hitch 106 can be coupled to the frame 110 near the upper portion of the frame 110. The first hitch 106 can be used to mate the trailer 120 with the configurable dolly 100. In some examples, the first hitch 106 can include, but is not limited to, a ball hitch, clevis hitch, or other type of trailer hitch. The frame 110 can support a portion of the weight of the trailer 120 (e.g., the tongue weight) on the at least one wheel 102 (two wheels as shown in the example of FIG. 1). In some examples, the frame 110 can be configured to support a load up to 2,000 lbs. or less, such as a 600 lb. load. The configurable dolly 100 can be used to mate with and maneuver any type of towable object. For instance, as described herein the trailer 120 can include any type of automotive trailer (e.g., a boat trailer, flatbed, or covered trailer), a warehouse pallet, cart, or other movable object.

The wheel 102 can be can be operatively coupled to the frame 110. For instance, the wheel 102 can be rotatably coupled to the frame 110. In some examples, the wheel 102 can be coupled to the frame 110 with an axle 103. In various examples, the axle 103 can be a straight axel (e.g., shared axle) coupled between two wheels 102. In other examples, each wheel 102 can be coupled to the frame with an independent axle. The axel 103 can include, but is not limited to, a full-floating or a semi-floating axle. In various examples, the configurable dolly 100 can include a plurality of wheels 102, a skid, track, ski, or other type of ground traversing element in place of or in addition to the wheel 102. For instance, in the example of FIG. 1, the configurable dolly 100 includes two wheels 102. The diameter and foot print of the wheel 102 can be configured for the load of the trailer 120 to be supported by the configurable dolly 100.

The tow bar 104 can provide a structure for positioning the handle 114 or second hitch 108 in one or more locations depending upon whether the configurable dolly 100 is used in the manual configuration or the vehicle towing configuration. The tow bar 104 can include a beam, tube, or other structure movably coupled to the frame 110. In some examples, the tow bar 104 can be constructed from steel, aluminum, or other material, such as a polymer or composite material. In the example of FIG. 1, the tow bar 104 can be coupled to the frame 110 by a hinge 124. For instance, the tow bar 104 can include a first end (e.g., the end 105) and a second end. In the example of FIG. 1, the second end is coupled to the frame 110 by the hinge 124. The tow bar 104 can be rotatable about the hinge 124 between the manual configuration and the vehicle towing configuration. In various examples, the hinge 124 can include, but is not limited to, a pin, bolt, rivet, or other type of pivot.

In the manual configuration, the tow bar 104 can be disposed from the frame 110 at the first angle A relative to the frame 110. At the first angle A, the tow bar 104 can position the handle 114 closer to a user's hands to facilitate manual maneuvering of the configurable dolly 100. For instance, the first angle A can dispose the end 105 of the tow bar 104, the handle 114, or both at a first distance D1 from the ground surface as shown in FIG. 1. The first distance D1 can be a value corresponding to a distance between a lower limit and an upper limit where a representative sample of users can grab the handle 114 without bending down and lift the handle 114 to a position further from the ground.

Figure 2:
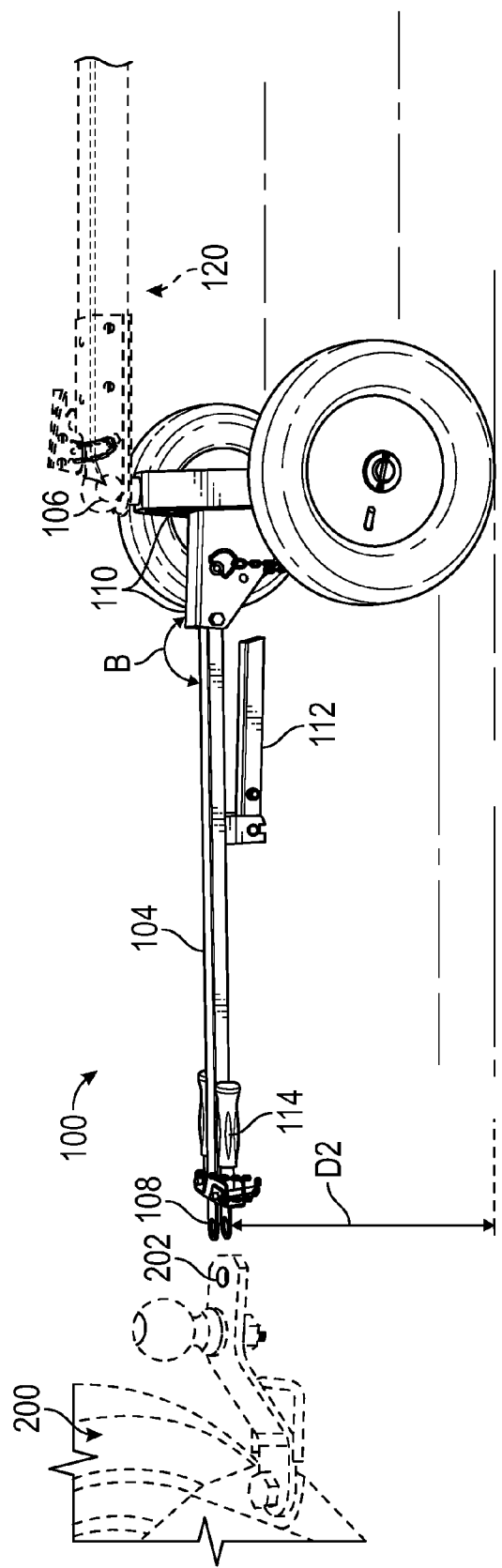
FIG. 2 illustrates an example of a configurable dolly in a vehicle configuration, according to an embodiment.

When the configurable dolly 100 is in the vehicle towing configuration (e.g., as shown illustratively in FIG. 2 and described herein), the tow bar 104 can be disposed at a second, lower, angle B with respect to the frame 110 (as shown, for example, in FIG. 2). The second hitch 108 can be attached to or near the end 105 of the tow bar 104. In some examples, the second hitch 108 can include, but is not limited to, a ball hitch, clevis hitch, or other type of trailer or vehicle hitch. The second angle B can position the second hitch 108 (e.g., tow hitch) closer to a height of a vehicle hitch receiver 202 (e.g., D2) as shown in FIG. 2 to facilitate coupling the configurable dolly 100 to the vehicle. For example, the second angle B can dispose the tow bar 104 in an orientation that is closer to horizontal than in the manual configuration. Accordingly, the second hitch 108 can be located closer to the ground surface and closer to the height of a vehicle hitch receiver 202. For instance, the end 105 of the tow bar 104, the handle 114, or both can be located at the second distance D2 form the ground as shown in the example of FIG. 2.

The locking mechanism 116 can selectively secure the tow bar 104 at the one or more angular orientations with respect to the frame 110. In various examples, the locking mechanism 116 can include, but is not limited to, one or more retaining pins, detents, clamps, gears, ratcheting mechanisms, latches, fasteners, or other type of locking mechanism. The locking mechanism 116 can be attached to the frame 110, such as welded or otherwise fastened to the frame 110.

In the example of FIG. 1, a retaining pin 126 can be used to secure the tow bar 104 in one or more orientations with respect to the frame 110, such as at the first angle A, the second angle B, any angle therebetween, or any other angle with respect to the frame 110. The locking mechanism 116 can include a plurality of apertures 128 one the frame 110. The apertures 128 can correspond to one or more orientations of the tow bar 104, such as the first angle A corresponding to the manual configuration, the second angle B corresponding to the vehicle towing configuration, or other angles. The tow bar 104 can include an aperture that can be aligned with one or more of the apertures 128 on the frame 110. The retaining pin 126 can be inserted through one of the apertures 128 and the aperture of the tow bar 104 to secure the tow bar 104 with respect to the frame 110. Accordingly, the retaining pin 126 can be removably inserted into the one or more apertures 128 of the locking mechanism 116 to secure the tow bar 104 in at least one of two or more configurations, such as the manual configuration or the vehicle towing configuration.

In an example, the configurable dolly 100 can include a retractable support member 112. The support member 112 can be a leg for supporting the configurable dolly 100 on the ground when the configurable dolly 100 is not in use or to hold the trailer stationary. The support member 112 can include a structure constructed from steel, aluminum, or other material, such as a polymer or composite material. In an example, the support member 112 can be a steel tube. In the example of FIG. 1, the support member 112 can be coupled to the tow bar 104 with a pivot 130. For example, the pivot 130 can include a fastener, such as a rivet, bolt, or the like. The support member 112 can include a stowed configuration (as shown in FIG. 2) and an extended configuration (as shown in FIG. 1).

In the extended configuration, the support member 112 can hold the configurable dolly 100, and accordingly, the trailer 120 in a stationary position. For instance, the support member 112 can inhibit the plurality of wheels 102 of the configurable dolly 100 from rolling along the ground, for example, by frictional engagement between the support member 112 and the ground. The first hitch 106 can be positioned so the trailer load (e.g., tongue weight) is applied to the configurable dolly 100 and directed between the wheels 102 and the support member 112. The trailer load can be equally or unequally distributed among the wheels 102 and the support member 112 accordingly.

In the stowed configuration, clearance can be provided between the support member 112 and the ground surface to facilitate maneuvering the configurable dolly 100. For instance, in the example of FIG. 2, the support member 112 can be rotated with respect to the tow bar 104 and stowed substantially parallel to the tow bar 104 to provide clearance between the support member 112 and the ground surface. A fastener 132 can be coupled between the support member 112 and the tow bar 104 to secure the support member 112 in the desired position (e.g., the extended configuration or the stowed configuration). The fastener 132 can be disengaged by the user in order to move the support member 112 between the extended and the stowed configurations.

The handle 114 can be used to maneuver the configurable dolly 100. For instance, the handle 114 can include any user interface for pushing, pulling, or otherwise positioning the configurable dolly 100. In various examples, the handle 114 can include a grip, strap (e.g., shoulder or waist strap), loop, shaft, or the like. In the example of FIG. 1, the configurable dolly 100 includes two handles (e.g., a handle 114 and a corresponding symmetrically-located handle).

In some examples, the handle 114 can be retractably coupled to the tow bar 104 to adjustably provide an extended configuration and a stowed configuration. For instance, the handle 114 can be rotatably coupled to the tow bar 104 to be adjustable between an extended configuration and a stowed configuration. FIG. 1 shows an example of the handle 114 adjusted to the extended configuration. The handle 114 can be attached to the tow bar 104 by a handle hinge 134. The handle hinge 134 can include, but is not limited to, one or more of a rivet, bolt, or other pivot or fastener. In the example of FIG. 1, the tow bar 104 can include a bracket 138. The handle hinge 134 can be located on the bracket 138 and the handle 114 can be rotatably coupled to the tow bar 104 accordingly. A lock pin 136 can be locatable through aligned apertures within the bracket 138 and the handle 114 to secure the handle 114 in the extended configuration. The lock pin 136 can be removable in order to move the handle 114 into the stowed configuration. To position the handle 114 in the stowed configuration, the handle 114 can be rotated with respect to the tow bar 104. For instance, the handle 114 can be positioned (e.g., stowed) alongside the tow bar 104 to provide clearance around the second hitch 108 (as shown in the example of FIG. 2).

FIG. 2 shows an example of the configurable dolly 100 in the vehicle towing configuration. In the vehicular towing configuration, the tow bar 104 can be rotated from the first angle A to the second angle B to lower the tow bar 104 and correspondingly the second hitch 108 for coupling the configurable dolly 100 to a vehicle, such as vehicle 200 as depicted in the example of FIG. 2. To facilitate clearance between the ground and the configurable dolly 100, the support member 112 can be rotated into the stowed configuration. The trailer 120 can be coupled to the first hitch 106 and accordingly the configurable dolly 100 can be used for towing the trailer 120. In an example, the handle 114 can be rotated into the stowed configuration to increase clearance between the configurable dolly 100 and the vehicle 200, for instance, where the vehicle 200 is turned with respect to the configurable dolly 100. Accordingly, the trailer 120 can be maneuvered via the configurable dolly 100 by the vehicle 200 without interference by the handle 114 or the support member 112. In this manner a vehicle, such as a car, truck, all-terrain vehicle (ATV), or other vehicle can be used to tow the trailer 120 using the apparatus and techniques described herein.

Figure 3:
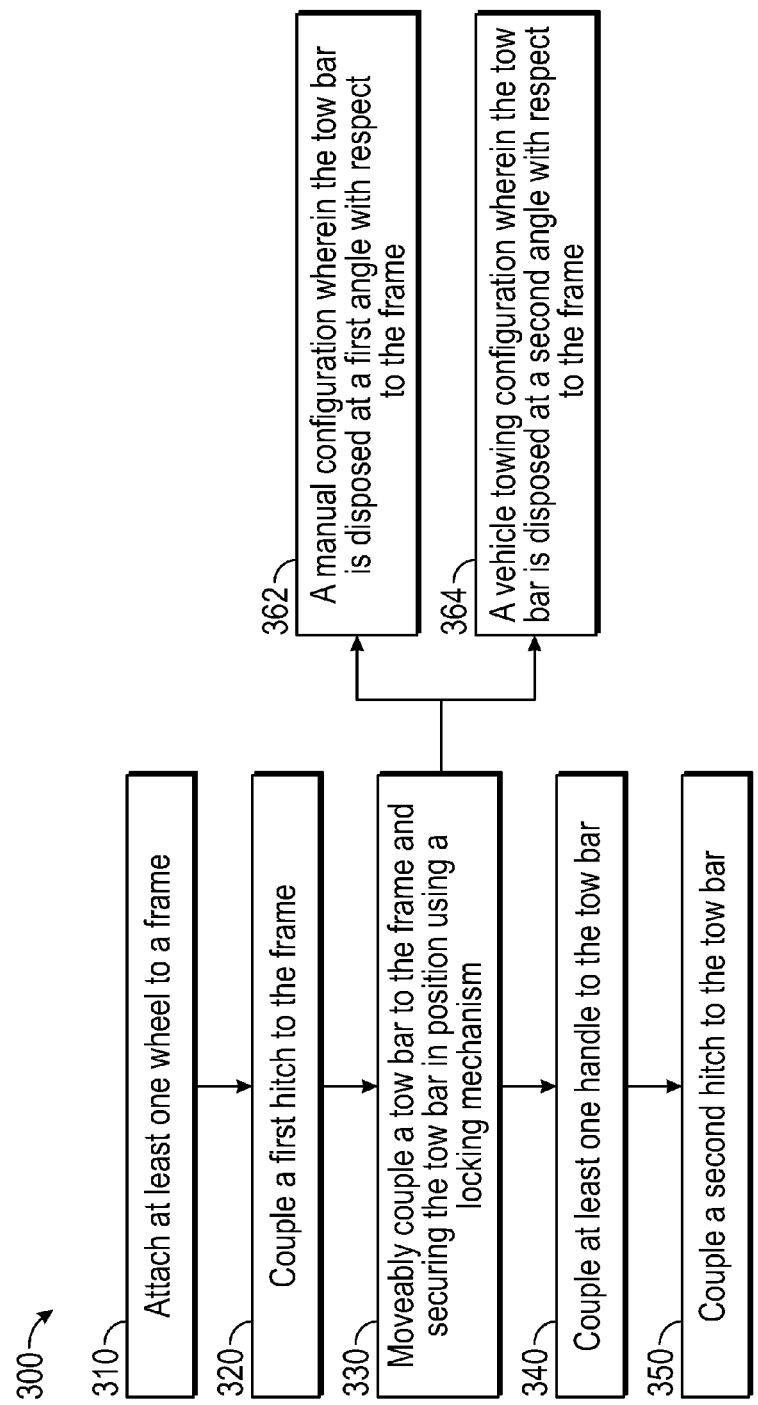
FIG. 3 is block diagram of an exemplary technique for making a configurable dolly, according to an embodiment.

FIG. 3 is an example of a method 300 for of making a configurable dolly, such as a multi-configuration trailer dolly having a manual configuration and a vehicle towing configuration, as previously described in the examples herein and shown for instance in FIGS. 1 and 2. In describing the method 300, reference is made to one or more components, features, functions, and processes previously described herein. Where convenient, reference is made to the components, features, processes and the like with reference numerals. Reference numerals provided are exemplary and are nonexclusive. For instance, features, components, functions, processes, and the like described in the method 300 include, but are not limited to, the corresponding numbered elements provided herein. Other corresponding features described herein (both numbered and unnumbered) as well as their equivalents are also considered.

At 310, at least one wheel (e.g., wheel 102) can be attached to a frame, such as frame 110, as previously described herein. Attaching the wheel to the frame can include using an axle to rotatably couple the wheel with the frame. For instance, the axle can include a floating or semi-floating axle. In some examples, the one or more wheels can be attached to the frame with individual axels, and in other examples, the two or more wheels can be coupled to the frame with a straight axle (e.g., shared axle) between a first and a second wheel. In various examples the configurable dolly includes at least two wheels. In further examples, the configurable dolly can include other types of ground traversing members, such as a skid, ski, track, or the like.

At 320, a first hitch (e.g., hitch 106 as previously shown and described herein) can be coupled to the frame. The first hitch can be configured to couple with a trailer receiver. In some examples, the first hitch can include a ball hitch, clevis hitch, or other type of hitch for coupling a trailer, cart, pallet, or other movable load to the configurable dolly. The first hitch can be coupled to the frame or a tow bar (e.g., tow bar 104 as previously described). For instance, the first hitch can be coupled to an upper portion of the frame using a bolt, welding, or other type of fastener.

At 330, a tow bar can be movably coupled to the frame and secured in position using a locking mechanism. For instance, the tow bar can be rotatably coupled to the frame with a hinge or other type of pivot, such as a bolt, pin, or the like. In some examples, the tow bar can be movably coupled to the frame between at least a manual configuration, a vehicle towing configuration, or disposed from the frame at any angle therebetween, as shown and described previously herein.

At 340, at least one handle, such as handle 114 previously described, can be coupled to the tow bar. In an example, the handle can be located near an end of the tow bar distal to the frame. The handle can include any type of grip, strap, loop, or user interface for a user to maneuver the configurable dolly manually or by hand. Two or more handles can be coupled to the configurable dolly, for instance, two symmetrically placed handles can be located at an end of the tow bar distal to the frame. In various examples, the handle can be retractably coupled to the tow bar and adjustable between a stowed configuration and an extended configuration. For instance, in the extended configuration the handle can be oriented substantially perpendicular (or otherwise disposed) from the tow bar. In the stowed configuration the handle can be rotated alongside of the tow bar, such as substantially parallel to the tow bar.

At 350, a second hitch can be coupled to the tow bar. The second hitch can be configured to couple to a vehicle. In various examples, the second hitch can include a ball hitch, clevis hitch, or other type of hitch for coupling to a vehicle hitch receiver. The second hitch can be coupled to the tow bar, such as near the end of the tow bar distal from the frame. In some examples, the second hitch can be coupled to the tow bar using a bolt, pin, other type of fastener, welding, or the like.

In some examples, the locking mechanism (e.g., the locking mechanism 116 as previously discussed herein) and the tow bar can be adjustable between at least two configurations, including a manual configuration and a vehicle towing configuration. For instance, the tow bar can be rotatably coupled to the frame, at least in part, using the locking mechanism. The locking mechanism can selectively secure the tow bar to the frame at one or more angular orientations with respect to the frame. In an example, the locking mechanism can include a pin that is insertable through one or more apertures of the tow bar, the frame, or both to secure the tow bar in at least one of the manual configuration, the vehicle towing configuration, or at any angle therebetween.

At 362, in the manual configuration, the tow bar can be disposed at a first angle with respect to the frame (e.g., the first angle A shown in the example of FIG. 1). For instance, in the manual configuration, the tow bar (e.g., the end 105 of the tow bar as previously described) can be located at a first distance (e.g., D1) from the ground.

At 364, in the vehicle towing configuration, the tow bar can be disposed at a second angle (e.g., B as shown in the example of FIG. 2) with respect to the frame. For instance, in the vehicle towing configuration the tow bar can be located at a second distance (e.g., D2) from the ground. The first distance can be greater than the second distance, for instance, so the configurable dolly is arranged for manual maneuvering in the manual configuration and the configurable dolly is arranged with the second hitch closer to the ground for coupling to a vehicle hitch receiver in the vehicle towing configuration.

The method 300 can optionally include rotatably coupling a retractable support member to the dolly. In an example the support member can include a support leg constructed of aluminum, steel, or other polymer or composite material. For instance, the retractable support member can include the support member 112 as previously described herein. The retractable support member can include a stowed configuration and an extended configuration. For instance, in the stowed configuration the support member can be located or oriented to increase the clearance between the support member and the ground so the support member is stowed away from interfering with maneuvering the configurable dolly and the trailer when the configurable dolly is in the vehicle towing configuration. In an example, the support member can be rotatably coupled to the tow bar or frame with a pivot, such as a pin, bolt, hinge, fastener, or other type of pivot. In another example, the support member can be secured to the tow bar or the frame with a fastener, such as a latch, pin, bolt, clip, clamp, detent, or the like. Accordingly, the support member can be secured in the stowed configuration or the extended configuration as needed.

Various Notes & Examples

Each of these non-limiting examples can stand on its own, or can be combined in various permutations or combinations with one or more of the other examples. To better illustrate the method and apparatuses disclosed herein, a non-limiting list of embodiments is provided here:

Example 1 is a configurable dolly, comprising: a frame including a wheel rotatably coupled to the frame; a first hitch coupled to the frame, the first hitch configured to mate with a trailer receiver; a tow bar coupled to the frame, the tow bar movable relative to the frame and secured in position using a locking mechanism; a handle located near an end of the tow bar distal to the frame; a second hitch located at the end of the tow bar distal to the frame; and wherein the locking mechanism and tow bar are arranged to provide at least two configurations, including: a manual configuration wherein the tow bar is disposed at a first angle relative to the fame; and a vehicle towing configuration wherein the tow bar is disposed at a different second angle relative to the frame.

In Example 2, the subject matter of Example 1 optionally includes two wheels rotatably coupled to the frame by an axle.

In Example 3, the subject matter of any one or more of Examples 1-2 optionally include wherein at least one of the first hitch or the second hitch is a ball hitch.

In Example 4, the subject matter of any one or more of Examples 1-3 optionally include wherein the handle is a strap.

In Example 5, the subject matter of any one or more of Examples 1-4 optionally include wherein the handle is retractably coupled to the tow bar to adjustably provide an extended configuration and a stowed configuration.

In Example 6, the subject matter of any one or more of Examples 1-5 optionally include wherein the tow bar is rotatably coupled to the frame at least in part using the locking mechanism and selectively secured to the locking mechanism at one or more angular orientations with respect to the frame.

In Example 7, the subject matter of any one or more of Examples 1-6 optionally include wherein the tow bar is rotatably coupled to the frame and a pin is insertable through one or more apertures of the tow bar or the frame to secure the tow bar in at least one of the manual configuration or the vehicle configuration.

In Example 8, the subject matter of any one or more of Examples 1-7 optionally include wherein in the manual configuration, the end of the tow bar and the handle are located further from the ground than in the vehicle towing configuration.

In Example 9, the subject matter of any one or more of Examples 1-8 optionally include a retractable support member coupled to the dolly, the retractable support member including a stowed configuration and an extended configuration.

In Example 10, the subject matter of Example 9 optionally includes wherein the foldable support member is a support leg.

In Example 11, the subject matter of Example 10 optionally includes wherein the retractable support member includes a fastener to lock the support member in one of the stowed configuration or the extended configuration.

Example 12 is a method of making a configurable dolly comprising: attaching at least one wheel to a frame; coupling a first hitch to the frame, the first hitch configured to couple with a trailer receiver; moveably coupling a tow bar to the frame and secured in position using a locking mechanism; coupling at least one handle to the tow bar, the handle located near an end of the tow bar distal to the frame; coupling a second hitch to the tow bar, the second hitch configured to couple to a vehicle; and wherein the locking mechanism and the tow bar are adjustable between at least two configurations, including: a manual configuration wherein the tow bar is disposed at a first angle with respect to the frame; and a vehicle towing configuration wherein the tow bar is disposed at a second angle with respect to the frame.

In Example 13, the subject matter of Example 12 optionally includes wherein attaching at least one wheel to a frame includes attaching two wheels rotatably coupled to the frame by an axle.

In Example 14, the subject matter of any one or more of Examples 12-13 optionally include wherein coupling the first hitch to the frame or coupling the second hitch to the tow bar includes coupling a ball hitch to at least one of the frame or the tow bar.

In Example 15, the subject matter of any one or more of Examples 12-14 optionally include wherein coupling at least one handle to the tow bar includes coupling two handles to the tow bar.

In Example 16, the subject matter of Example 15 optionally includes wherein coupling at least one handle to the tow bar includes retractably coupling the handle the tow bar, the handle adjustable between an extended configuration and a stowed configuration.

In Example 17, the subject matter of any one or more of Examples 12-16 optionally include wherein moveably coupling a tow bar to the frame includes rotatably coupling the tow bar, at least in part, to the locking mechanism and selectively securing the tow bar to the locking mechanism at one or more angular orientations with respect to the frame.

In Example 18, the subject matter of any one or more of Examples 12-17 optionally include wherein moveably coupling a tow bar to the frame includes rotatably coupling the tow bar to the frame and inserting a pin through one or more apertures of the tow bar, the frame, or both to secure the tow bar in at least one of the manual configuration or the vehicle configuration.

In Example 19, the subject matter of any one or more of Examples 12-18 optionally include wherein moveably coupling a tow bar to the frame includes movably coupling the tow bar at a first distance from the ground in the manual configuration and a second distance from the ground in the vehicle towing configuration, wherein the first distance is greater than the second distance.

In Example 20, the subject matter of any one or more of Examples 12-19 optionally include rotatably coupling a retractable support member to the dolly, the retractable support member including a stowed configuration and an extended configuration.

In Example 21, the subject matter of Example 20 optionally includes wherein rotatably coupling the retractable support member to the dolly includes rotatably coupling a support leg to the tow bar.

In Example 22, the subject matter of Example 21 optionally includes wherein rotatably coupling the retractable support member to the dolly includes securing the support member in one of the stowed configuration or the extended configuration.

Example 23 is a configurable dolly, comprising: a frame including at least two wheels rotatably coupled to the frame; a first hitch coupled to the frame, the first hitch configured to mate with a trailer receiver; a tow bar coupled to the frame, the tow bar movable relative to the frame and selectively secured in one or more angular orientations with respect to the frame using at least in part a locking mechanism; a handle located near an end of the tow bar distal to the frame; a second hitch located at the end of the tow bar distal to the frame; and wherein the locking mechanism and tow bar are arranged to provide at least two configurations, including: a manual configuration wherein the tow bar is disposed at a first angle relative to the fame, and the end of the tow bar and the handle are located at a first distance from the ground; and a vehicle towing configuration wherein the tow bar is disposed at a different second angle relative to the frame, and the end of the tow bar and the handle are located at a second distance from the ground, wherein the second distance is less than the first distance.

In Example 24, the subject matter of Example 23 optionally includes wherein the handle is retractably coupled to the tow bar to adjustably provide an extended configuration and a stowed configuration.

In Example 25, the subject matter of any one or more of Examples 23-24 optionally include a retractable support member coupled to the dolly, the retractable support member including a stowed configuration and an extended configuration.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The claimed invention is:
1. A configurable dolly, comprising:
a frame including a wheel rotatably coupled to the frame;
a first hitch coupled to the frame, the first hitch configured to mate with a trailer receiver;

a tow bar coupled to the frame, the tow bar movable relative to the frame and securable in position using a locking mechanism;

a handle located near an end of the tow bar distal to the frame;

a second hitch located at the end of the tow bar distal to the frame; and wherein the locking mechanism and tow bar are arranged to provide at least two configurations, including:

a manual configuration wherein the tow bar is disposed at a first angle relative to the fame; and a vehicle towing configuration wherein the tow bar is disposed at a different second angle relative to the frame;

wherein in the manual configuration, the end of the tow bar and the handle are located further from the ground than in the vehicle towing configuration.

2. The configurable dolly of claim 1, further comprising two wheels rotatably coupled to the frame by an axle.

3. The configurable dolly of claim 1, wherein at least one of the first hitch or the second hitch is a ball hitch.

4. The configurable dolly of claim 1, wherein the handle is retractably coupled to the tow bar to adjustably provide an extended configuration and a stowed configuration.

5. The configurable dolly of claim 1, wherein the tow bar is rotatably coupled to the frame at least in part using the locking mechanism and selectively secured to the locking mechanism at one or more angular orientations with respect to the frame.

6. The configurable dolly of claim 1, wherein the tow bar is rotatably coupled to the frame and a pin is insertable through one or more apertures of the tow bar or the frame to secure the tow bar in at least one of the manual configuration or the vehicle towing configuration.

7. The configurable dolly of claim 1, further comprising a retractable support member coupled to the dolly, the retractable support member including a stowed configuration and an extended configuration.

8. The configurable dolly of claim 7, wherein the retractable support member is a support leg.

9. The configurable dolly of claim 7, wherein the retractable support member includes a fastener to lock the support member in one of the stowed configuration or the extended configuration.

10. A method of making a configurable dolly comprising:
attaching at least one wheel to a frame;
coupling a first hitch to the frame, the first hitch configured to couple with a trailer receiver;
moveably coupling a tow bar to the frame and securing the tow bar in position using a locking mechanism;
coupling at least one handle to the tow bar, the handle located near an end of the tow bar distal to the frame;
coupling a second hitch to the tow bar, the second hitch configured to couple to a vehicle; and
wherein the locking mechanism and the tow bar are adjustable between at least two configurations, including:
a manual configuration wherein the tow bar is disposed at a first angle with respect to the frame; and
a vehicle towing configuration wherein the tow bar is disposed at a second angle with respect to the frame;
wherein in the manual configuration, the end of the tow bar and the handle are located further from the ground than in the vehicle towing configuration.

11. The method of claim 10, wherein coupling at least one handle to the tow bar includes retractably coupling the handle the tow bar, the handle adjustable between an extended configuration and a stowed configuration.

12. The method of claim 10, wherein moveably coupling a tow bar to the frame includes rotatably coupling the tow bar, at least in part, to the locking mechanism and selectively securing the tow bar to the locking mechanism at one or more angular orientations with respect to the frame.

13. The method of claim 10, wherein moveably coupling a tow bar to the frame includes rotatably coupling the tow bar to the frame and inserting a pin through one or more apertures of the tow bar, the frame, or both to secure the tow bar in at least one of the manual configuration or the vehicle configuration.

14. The method of claim 10, further comprising rotatably coupling a retractable support member to the dolly, the retractable support member including a stowed configuration and an extended configuration.

15. A configurable dolly, comprising:
a frame including at least two wheels rotatably coupled to the frame;
a first hitch coupled to the frame, the first hitch configured to mate with a trailer receiver;
a tow bar coupled to the frame, the tow bar movable relative to the frame and selectively secured in one or more angular orientations with respect to the frame using at least in part a locking mechanism;
a handle located near an end of the tow bar distal to the frame;
a second hitch located at the end of the tow bar distal to the frame; and
wherein the locking mechanism and tow bar are arranged to provide at least two configurations, including:
a manual configuration wherein the tow bar is disposed at a first angle relative to the fame, and the end of the tow bar and the handle are located at a first distance from the ground; and
a vehicle towing configuration wherein the tow bar is disposed at a different second angle relative to the frame, and the end of the tow bar and the handle are located at a second distance from the ground, wherein the second distance is less than the first distance;
wherein at least one of the first hitch or the second hitch is a ball hitch; and
wherein the handle is retractably coupled to the tow bar to adjustably provide an extended configuration and a stowed configuration.

16. The configurable dolly of claim 15, further comprising a retractable support member coupled to the dolly, the retractable support member including a stowed configuration and an extended configuration.

17. The configurable dolly of claim 16, wherein the retractable support member is a support leg.

18. The configurable dolly of claim 16, wherein the retractable support member includes a fastener to lock the support member in one of the stowed configuration or the extended configuration.

19. The configurable dolly of claim 15, wherein the tow bar is rotatably coupled to the frame and a pin is insertable through one or more apertures of the tow bar or the frame to secure the tow bar in at least one of the manual configuration or the vehicle towing configuration.

\* \* \* \* \*